US012246733B2

(12) United States Patent
Ma et al.

(10) Patent No.: US 12,246,733 B2
(45) Date of Patent: Mar. 11, 2025

(54) SYSTEM AND METHOD OF OFF-BOARD-CENTRIC AUTONOMOUS DRIVING COMPUTATION

(71) Applicant: CYNGN, INC., Menlo Park, CA (US)

(72) Inventors: Biao Ma, Sunnyvale, CA (US); Lior Tal, San Diego, CA (US)

(73) Assignee: CYNGN, INC., Menlo Park, CA (US)

(*) Notice: Subject to any disclaimer, the term of this patent is extended or adjusted under 35 U.S.C. 154(b) by 0 days.

(21) Appl. No.: 17/822,394

(22) Filed: Aug. 25, 2022

(65) Prior Publication Data
US 2023/0060383 A1 Mar. 2, 2023

Related U.S. Application Data

(60) Provisional application No. 63/366,738, filed on Jun. 21, 2022, provisional application No. 63/237,038, (Continued)

(51) Int. Cl.
*B60W 50/04* (2006.01)
*B60W 50/00* (2006.01)
(Continued)

(52) U.S. Cl.
CPC .... *B60W 50/0205* (2013.01); *B60W 50/0097* (2013.01); *B60W 50/023* (2013.01); (Continued)

(58) Field of Classification Search
CPC ........... B60W 50/023; B60W 50/0097; B60W 50/0205; B60W 60/0027; B60W 30/00; (Continued)

(56) References Cited

U.S. PATENT DOCUMENTS 5,630,148 A * 5/1997 Norris ............... G06F 1/08
713/322
5,889,989 A * 3/1999 Robertazzi ........... G06F 9/5088
718/105
(Continued)

FOREIGN PATENT DOCUMENTS

GB       2613740 A  *  6/2023  ........... B60W 30/09
KR    20190037438     *  4/2019
KR    20210067432     *  3/2021  ........... G05B 19/042

OTHER PUBLICATIONS

Gao et al., "Joint Computation Offloading and Prioritized Scheduling in Mobile Edge Computing," in International Conference on High Performance Computing & Simulation (HPCS), Orleans, France, 2018, pp. 1000-1007, https://ieeexplore.ieee.org/document/8514462. (Year: 2018).*

(Continued)

*Primary Examiner* — Daniel M. Robert
(74) *Attorney, Agent, or Firm* — Maschoff Brennan

(57) ABSTRACT

An autonomous driving computing system may include an on-board computing system that is configured to perform first operations that include obtaining sensor data relating to an autonomous vehicle (AV). The first operations may include sending the obtained sensor data to an off-board cloud computing system. The autonomous driving computing system may include the off-board cloud computing system, which may be configured to perform second operations that include receiving the sensor data and performing computations relating to the driving operation of the AV based on the obtained sensor data. The second operations may include determining a control signal corresponding to a driving operation and sending the control signal to the on-board computing system. The first operations may involve the on-board computing system receiving, from the off-board cloud computing system, the control signal cor- (Continued)

responding to the driving operation of the AV and performing the driving operation by implementing the control signal.

20 Claims, 6 Drawing Sheets

Related U.S. Application Data filed on Aug. 25, 2021, provisional application No. 63/237,036, filed on Aug. 25, 2021, provisional application No. 63/237,035, filed on Aug. 25, 2021.

(51) Int. Cl.
*B60W 50/02* (2012.01)
*B60W 50/023* (2012.01)
*B60W 50/06* (2006.01)
*B60W 60/00* (2020.01)
*G05D 1/00* (2024.01)

(52) U.S. Cl.
CPC .......... *B60W 50/045* (2013.01); *B60W 50/06* (2013.01); *B60W 60/0027* (2020.02); *G05D 1/0088* (2013.01); *B60W 2050/046* (2013.01); *B60W 2556/45* (2020.02)

(58) Field of Classification Search
CPC ......... B60W 2556/45; B60W 2554/00; B60W 40/04; G05D 1/0212; G05D 1/0214; G05D 1/0231; G05D 1/0297; G05D 2201/0213; G05D 1/0027; G05D 1/0022; G05D 1/0088; G01C 21/34; G07C 5/008; G06Q 10/06398

See application file for complete search history.

(56) References Cited

U.S. PATENT DOCUMENTS

| | | | |
|---|---|---|---|
| 9,008,890 B1 * | 4/2015 | Herbach | G07C 5/008 |
| | | | 340/436 |
| 10,139,828 B2 * | 11/2018 | Ho | B60W 30/00 |
| 10,331,127 B2 * | 6/2019 | Oba | B60W 50/082 |
| 10,754,706 B1 * | 8/2020 | Mo | G06F 9/5038 |
| 2013/0132754 A1 * | 5/2013 | Hanappe | G06F 1/3228 |
| | | | 713/323 |
| 2013/0258136 A1 * | 10/2013 | Lee | H04N 1/2145 |
| | | | 348/231.99 |
| 2017/0177002 A1 * | 6/2017 | Ogura | G05D 1/0278 |
| 2018/0040240 A1 | 2/2018 | Newman | |
| 2019/0051064 A1 * | 2/2019 | Tojima | G05B 23/0224 |
| 2019/0152490 A1 | 5/2019 | Lan et al. | |
| 2019/0258251 A1 * | 8/2019 | Ditty | G06F 15/7807 |
| 2019/0337526 A1 * | 11/2019 | Rave | G06F 21/554 |
| 2020/0142403 A1 * | 5/2020 | Chi | G05D 1/0223 |
| 2020/0177885 A1 * | 6/2020 | Brugman | H04N 19/31 |
| 2020/0257560 A1 * | 8/2020 | Wang | H04L 47/6295 |
| 2020/0284883 A1 * | 9/2020 | Ferreira | G01S 17/10 |
| 2021/0027186 A1 * | 1/2021 | Sanchirico | H04W 4/70 |
| 2021/0188294 A1 * | 6/2021 | Kain | B60W 50/023 |
| 2021/0190914 A1 * | 6/2021 | Kunz | G01S 17/06 |
| 2021/0362733 A1 * | 11/2021 | Yoon | H04N 17/00 |
| 2021/0403032 A1 * | 12/2021 | Jing | G05D 1/0022 |
| 2022/0201204 A1 * | 6/2022 | Hirata | H04N 25/40 |
| 2022/0227379 A1 * | 7/2022 | Robinson | B60W 40/02 |
| 2022/0295399 A1 * | 9/2022 | Lee | H02J 7/00032 |
| 2022/0315062 A1 * | 10/2022 | Kondapally | B60W 60/00253 |
| 2022/0342702 A1 * | 10/2022 | Drory | G06F 9/3867 |
| 2022/0343757 A1 * | 10/2022 | Uchiyama | B60W 40/04 |

OTHER PUBLICATIONS

PCT International Search Report and Written Opinion issued in corresponding application No. PCT/US2022/041602, dated Jan. 9, 2023.

* cited by examiner

SYSTEM AND METHOD OF OFF-BOARD-CENTRIC AUTONOMOUS DRIVING COMPUTATION

CROSS-REFERENCE TO RELATED APPLICATIONS

This application claims the benefit of U.S. patent application Ser. No. 63/237,035, filed on Aug. 25, 2021, U.S. patent application Ser. No. 63/237,036, filed on Aug. 25, 2021, U.S. patent application Ser. No. 63/237,038, filed on Aug. 25, 2021, and U.S. patent application Ser. No. 63/366,738, filed on Jun. 21, 2022; the disclosures of which are incorporated herein by reference in their entireties.

FIELD OF THE INVENTION

The present disclosure generally relates to a system and method of off-board-centric autonomous driving computation.

BACKGROUND

An autonomous vehicle may scan an environment in which the autonomous vehicle is located using one or more sensors positioned on and/or around the autonomous vehicle. The autonomous vehicle may detect objects based on data collected by the sensors and avoid objects in a path of travel of the autonomous vehicle based on the detected objects.

The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One or more embodiments of the present disclosure may include an autonomous driving computing system that includes an on-board computing system that is configured to store first instructions that, in response to being executed, cause the autonomous driving computing system to perform first operations. The first operations may include obtaining sensor data relating to an autonomous vehicle (AV) and a total measurable world around the AV and sending the obtained sensor data to an off-board cloud computing system. The autonomous driving computing system may include the off-board cloud computing system comprising one or more computing subsystems, the computing subsystems configured to perform one or more computations relating to the driving operation of the AV, wherein the off-board cloud computing system is configured to store second instructions that, in response to being executed, cause the off-board cloud computing system to perform second operations. The second operations may include receiving, from the on-board computing system, the sensor data and performing, by the computing subsystems of the off-board cloud computing system, the computations relating to a driving operation of the AV based on the obtained sensor data. The second operations may also include determining a control signal corresponding to the driving operation of the AV and sending the control signal to the on-board computing system. The first operations of the on-board computing system may include receiving, from the off-board cloud computing system, the control signal corresponding to the driving operation of the AV and performing the driving operation by implementing the control signal.

In some embodiments, the autonomous driving computing system may further include a redundant basic automation system that is configured to take over future driving operation of the AV responsive to determining that a connection to the off-board cloud computing system is unavailable. The redundant basic automation system may be limited to performing remedial actions to slow and stop the AV.

In some embodiments, the computing subsystems of the off-board cloud computing system may include at least one of: a perception system, a localization system, a fusion system, a prediction system, a decision-making system, a diagnostic system, and a planning system.

In some embodiments, the on-board computing system may include one or more sensor groups, a communication bus, a computing device with storage and instructions limited to performing remedial actions and the first operations, and a real vehicle drive-by-wire system.

In some embodiments, the off-board cloud computing system may include a greater number of computational resources than the on-board computing system.

In some embodiments, performing the computations may include at least one of: performing operations related to perception of the total measurable world, localization of the AV, fusion of the sensor data, prediction of trajectories of objects around the AV, and rendering a decision of a next driving operation.

One or more embodiments of the present disclosure may include a method that includes obtaining, by an on-board computing system associated with an autonomous vehicle (AV), sensor data relating to the AV and a total measurable world around the AV and sending the obtained sensor data to an off-board cloud computing system. The method may include receiving, by the off-board cloud computing system, the sensor data and performing, by one or more computing subsystems of the off-board cloud computing system, computations relating to a driving operation of the AV based on the obtained sensor data. The method may also include determining, by the off-board cloud computing system, a control signal corresponding to the driving operation of the AV and sending the control signal to the on-board computing system. The method may include receiving, by the on-board computing system, the control signal corresponding to the driving operation of the AV and performing the driving operation by implementing the control signal.

In some embodiments, the method may further include determining whether a connection to the on-board computing system or the off-board cloud computing system is unavailable. Responsive to determining that the connection to the on-board computing system or the off-board cloud computing system is unavailable, a redundant basic automation system may control a future driving operation of the AV. The redundant basic automation system may be limited to performing remedial actions to slow and stop the AV.

In some embodiments, the computing subsystems may include at least one of: a perception system, a localization system, a fusion system, a prediction system, a decision-making system, a diagnostic system, and a planning system.

In some embodiments, the on-board computing system may include one or more sensor groups, a communication bus, a computing device with storage and instructions limited to performing remedial actions and communication with the off-board cloud computing system, and a real vehicle drive-by-wire system.

In some embodiments, the off-board cloud computing system may include a greater number of computational resources than the on-board computing system.

In some embodiments, performing the computations may include at least one of: performing operations related to perception of the total measurable world, localization of the AV, fusion of the sensor data, prediction of trajectories of objects around the AV, and rendering a decision of a next driving operation.

One or more embodiments of the present disclosure may include one or more non-transitory computer-readable storage media configured to store instructions that, in response to being executed, cause a system to perform operations. The operations may include obtaining, by an on-board computing system associated with an autonomous vehicle (AV), sensor data relating to the AV and a total measurable world around the AV and sending the obtained sensor data to an off-board cloud computing system. The operations may include receiving, by the off-board cloud computing system, the sensor data and performing, by one or more computing subsystems of the off-board cloud computing system, computations relating to a driving operation of the AV based on the obtained sensor data. The operations may also include determining, by the off-board cloud computing system, a control signal corresponding to the driving operation of the AV and sending the control signal to the on-board computing system. The operations may include receiving, by the on-board computing system, the control signal corresponding to the driving operation of the AV and performing the driving operation by implementing the control signal.

In some embodiments, the operations may further include determining whether a connection to the on-board computing system or the off-board cloud computing system is unavailable. Responsive to determining that the connection to the on-board computing system or the off-board cloud computing system is unavailable, a redundant basic automation system may control a future driving operation of the AV. The redundant basic automation system may be limited to performing remedial actions to slow and stop the AV.

In some embodiments, the computing subsystems may include at least one of: a perception system, a localization system, a fusion system, a prediction system, a decision-making system, a diagnostic system, and a planning system.

In some embodiments, the on-board computing system may include one or more sensor groups, a communication bus, a computing device with storage and instructions limited to performing remedial actions and communication with the off-board cloud computing system, and a real vehicle drive-by-wire system.

In some embodiments, the off-board cloud computing system may include a greater number of computational resources than the on-board computing system.

In some embodiments, performing the computations may include at least one of: performing operations related to perception of the total measurable world, localization of the AV, fusion of the sensor data, prediction of trajectories of objects around the AV, and rendering a decision of a next driving operation.

The object and advantages of the embodiments will be realized and achieved at least by the elements, features, and combinations particularly pointed out in the claims. It is to be understood that both the foregoing general description and the following detailed description are explanatory and are not restrictive of the invention, as claimed.

BRIEF DESCRIPTION OF THE DRAWINGS

Example embodiments will be described and explained with additional specificity and detail through the accompanying drawings in which.

DETAILED DESCRIPTION

Figure 1:
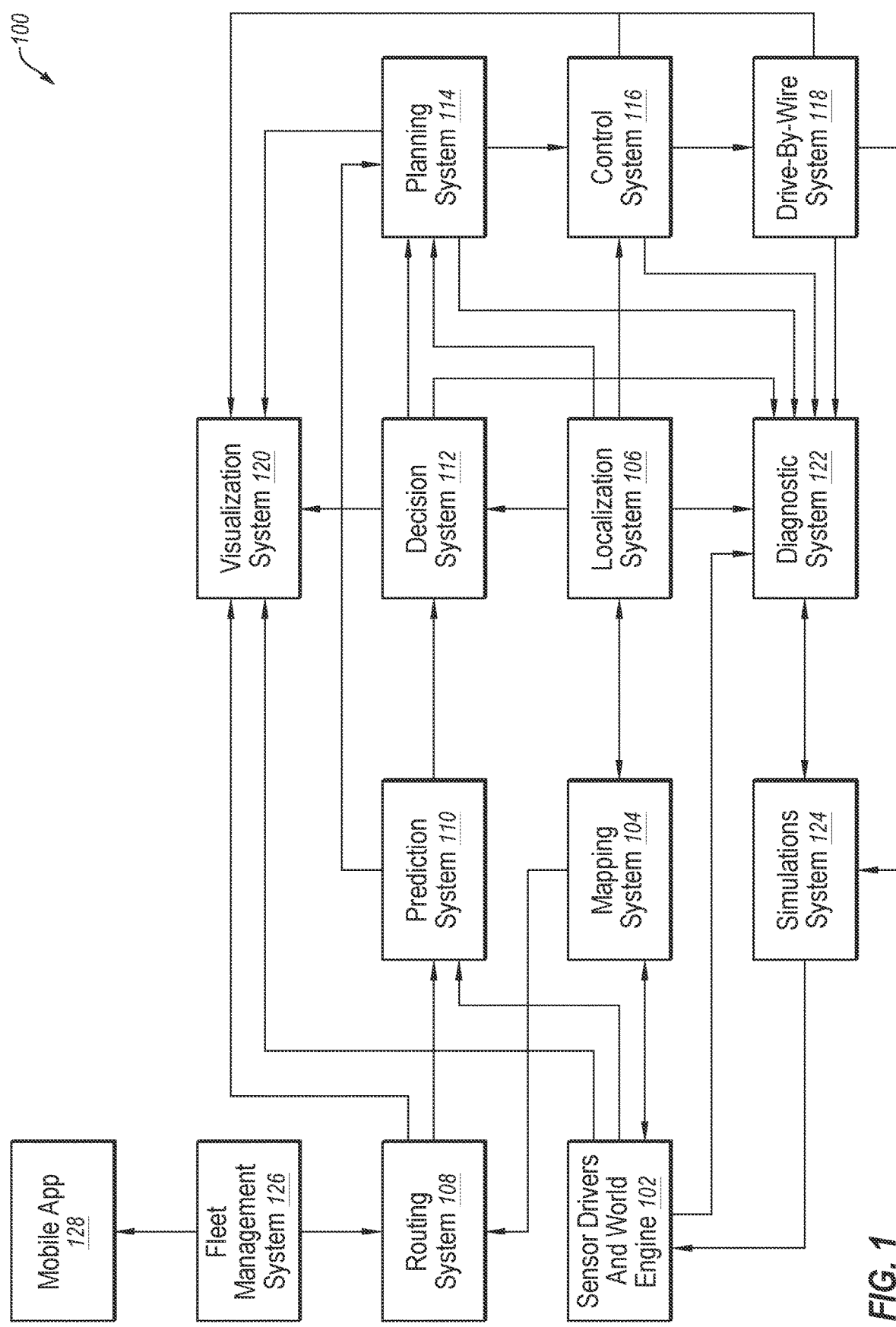
FIG. 1 illustrates an example embodiment of an autonomous driving system according to at least one embodiment of the present disclosure.

The present disclosure relates to an adaptive support computing system architecture for autonomous driving that is configured to allocate computations associated with operations of an autonomous vehicle (AV) between a computing system located on board the AV ("on-board computing system") and an off-board cloud computing system. In some circumstances, the on-board computing system may include lower computing speed and/or less computing resources than the off-board cloud computing system. In these and other circumstances, however, the on-board computing system may perform computations at lower latencies than the off-board cloud computing system such that some computational results of the on-board computing system are obtained more quickly than the computational results of the off-board cloud computing system. By allocating some operations of the AV to the on-board computing system and other operations to the off-board cloud computing system, the overall functionality and efficiency of the AV computing system may be improved.

AVs typically include seating space for human drivers and passengers comparable to traditional sedans and trunk storage space comparable to traditional sedans. Additionally or alternatively, AVs may include an electric motor, a battery for the electric motor, and charging components that facilitate providing motive power to the AV. Consequently, AVs may include limited space in which electrical components and/or computing components may be installed, or the AVs may be manufactured to be larger, which increases manufacturing costs, increases energy consumption, decreases driving range, or some combination thereof. Because the space available for electrical components and/or computing components is often limited for AVs, the processing power available to perform on-board computations associated with driving operations of the AVs may be similarly limited without increasing the size of the AVs.

More resource-intensive computations being performed by the AVs may also increase energy consumption, which may be supplied by an on-board battery system. Because the on-board battery systems may also be used to power the electric motors of the AVs, the driving ranges of the AVs may decrease as more resource-intensive computations are processed. Consequently, decreasing the computational processing load processed by on-board computing systems may increase the battery efficiency and driving range of the AVs.

In some embodiments, one or more computing subsystems that are configured to perform operations associated with a given AV may be allocated to an off-board support cloud computing system so that computations relating to the one or more computing subsystems are performed using computational resources of the off-board support cloud computing system and sent to an on-board computing system associated with the given AV. Computing subsystems corresponding to the on-board computing system may be configured to perform computing operations that facilitate driving of the given AV using the information provided by the computing subsystems allocated to the off-board support cloud computing system.

Computations performed by an existing AV computing system may involve thirty computation elements, forty computation elements, fifty computation elements, sixty computation elements, seventy computation elements, eighty computation elements, or any other number of computation elements in a given frame of operation that may be computed to facilitate driving operations of a given AV during the given frame. Computing systems are configured to process computation elements sequentially, and consequently, each of the computation elements in the given frame of operation may be computed sequentially by the existing on-board computing system of the given AV.

Configuration of an on-board computing system and the off-board support cloud computing system using a computer architecture as described in the present disclosure may, among other things, facilitate parallel performance of the computation elements such that the given frame of operation may be executed more quickly and/or accurately than by existing on-board computing systems alone. The off-board support cloud computing system may include one or more computing systems communicatively coupled with one another such that the computation elements are computed in parallel rather than sequentially because the computations off-loaded to the off-board support cloud computing system may be simultaneously performed by the one or more computing systems.

Because different computation elements may involve different computation resource usages, prioritizing computation elements according to a scheduling policy may facilitate more efficient and faster processing of the computation elements. For example, a first given computation element may involve significantly greater computation resource usage than a second given computation element, but the first given computation element may be received by a computing system before the second given computation element. Rather than processing the first given computation element before the second given computation element, the second given computation element may be processed before the first given computation element assuming the two computation elements are equally important or approximately of equal importance.

Accordingly, the computer architecture according to the present disclosure may improve scheduling of such computation elements between the on-board computing system and the off-board support cloud computing system. In some embodiments, the computer architecture may involve off-loading of more resource-intensive computation elements to the off-board support cloud computing system, while less resource-intensive computation elements are designated for the on-board computing system to process.

Additionally or alternatively, managing the scheduling of computation elements according to the present disclosure may improve context switching between the computation elements. A decoding process and an encoding process may be performed by a computing system to process a given computation element, and because the decoding process and the encoding process may be involved in processing each computation element, sequencing the computation elements to decrease the amount of time spent on decoding and encoding of computation elements may lead to faster and more efficient processing of the computation elements. An AV computing system that includes an on-board computing system and an off-board support cloud computing system as described in the present disclosure may provide more flexible computation element processing by sequentially grouping computation elements and designating the sequentially grouped computation elements for processing by either the on-board computing system or the off-board support cloud computing system to decrease the amount of time and resources spent on decoding and encoding of the computation elements.

In some embodiments, data received or obtained for a given computing system may be intentionally encoded for off-board computation. For example, certain aspects of data collection, computing outputs, or other data generation associated with the numerous computing sub-systems of an AV may be configured to generate or output data in a context for the off-board computing system such that the computational load from context switching may be reduced.

In some embodiments, the off-board computing system may be configured to perform all or most of the computations associated with driving operations of a given AV. In these and other embodiments, context switches between computing processes performed on board the given AV and/or by the off-board computing system may be decreased, which may result in more efficient, faster, and/or less resource-intensive computing operations. Additionally or alternatively, empty cycling computing processes that involve the on-board computing system and/or the off-board computing system processing empty cycles while waiting for computational outputs from the off-board computing system and/or the on-board computing system, respectively, may be decreased because all or most of the computing processes are being handled by the off-board computing system.

Configuring the given AV according to at least one embodiment of the present disclosure may allow the given AV to be designed as an ultra-lightweight AV because the complexity, and corresponding size and/or weight, of an on-board computing system may be decreased. Additionally or alternatively, a manufacturing cost of the given AV may be significantly decreased because installing a complex on-board computing system may be unnecessary. Instead, a low-cost, easy-to-install computing system may be installed on board the given AV, while resource-intensive computations are performed using an off-board, high-performance cloud computing system.

Additionally or alternatively, configuring the given AV according to at least one embodiment of the present disclosure may facilitate fleet-level management of the given AV along with one or more other AVs. Because an off-board cloud computing system may process all or most of the computations relating to the given AV, the off-board cloud computing system may facilitate computational and/or operational coordination between multiple AVs.

Embodiments of the present disclosure will be explained with reference to the accompanying drawings.

FIG. 1 illustrates an example embodiment of an autonomous driving system 100 according to at least one embodiment of the present disclosure. The autonomous driving system 100 may include one or more computer systems and/or software modules configured to perform one or more operations involved with driving an autonomous vehicle. Various aspects of the autonomous driving system 100 may be included on-board with the autonomous vehicle itself, or with a remote system in communication with the autonomous vehicle, such as a cloud computing system, a server, or a mobile device. In some embodiments, the autonomous driving system 100 may include sensor drivers and a world engine 102 that is configured to capture and process sensor data relating to an environment in which the autonomous vehicle travels, such as information relating to what objects are present in the environment and where such objects are located relative to the autonomous vehicle. The sensor data related to the autonomous vehicle's environment may be sent to a mapping system 104 to generate a virtual map of the environment. In some embodiments, the virtual map may be sent from the mapping system 104 back to the sensor drivers and world engine 102 to provide a map on which the sensor data relating to environmental objects may be oriented. Additionally or alternatively, the virtual map may provide a map onto which environmental topography may be plotted.

The virtual map of the mapping system 104 may be sent to a localization system 106 and/or a routing system 108. The localization system 106 may provide an estimated location of the autonomous vehicle within the environment and/or the virtual map, and the routing system 108 may compute a route between the estimated location of the autonomous vehicle to a designated destination along a valid path included in the virtual map.

In some embodiments, the sensor data of the sensor drivers and world engine 102 may be sent to a prediction system 110 that is configured to predict movement and/or trajectories of one or more objects in the vicinity of the autonomous vehicle and/or the autonomous vehicle itself. A decision system 112 may obtain the predicted object trajectories from the prediction system 110, and based on a location of the autonomous vehicle as determined by the localization system 106, the decision system 112 may determine one or more driving decisions according to various driving rules. The driving decisions determined by the decision system 112 may be sent to a planning system 114 that processes, parses, and/or queues the driving decisions for a downstream control system 116. In some embodiments, the control system 116 may generate control signals that are obtained by a drive-by-wire system 118 or another actuation system that controls one or more operations of the autonomous vehicle.

In some embodiments, the autonomous driving system 100 may include a visualization system 120 that is configured to obtain information from the sensor drivers and world engine 102, the prediction system 110, the decision system 112, the planning system 114, the control system 116, the drive-by-wire system 118, or any other computer system of the autonomous driving system 100. The visualization system 120 may generate two-dimensional and/or three-dimensional models of the autonomous vehicle, objects in the vicinity of the autonomous vehicle, and/or the environment in which the autonomous vehicle operates. Additionally or alternatively, the visualization system 120 may provide a visual representation of movement and/or predicted trajectories of the autonomous vehicle and/or any of the nearby objects.

In some embodiments, the autonomous driving system 100 may include a diagnostics system 122 that is configured to obtain information from the sensor drivers and world engine 102, the prediction system 110, the decision system 112, the planning system 114, the control system 116, the drive-by-wire system 118, or any other computer system of the autonomous driving system 100. The diagnostics system 122 may run diagnostic tests to assess the accuracy and/or validity of determinations and decisions made by other computer systems of the autonomous driving system 100.

In these and other embodiments, the diagnostics system 122 may be communicatively coupled to a simulations system 124 that provides a virtual environment in which the determinations and decisions made by other computer systems and/or software modules of the autonomous driving system 100 may be simulated to identify any issues with the simulated determinations and decisions. Additionally or alternatively, the simulations system 124 may obtain information from the drive-by-wire system 118 so that the simulations system 124 may run simulations based on control signals implemented by the autonomous vehicle in the real world. The simulations system 124 may virtually determine movements of the autonomous vehicle and/or of one or more objects in the vicinity of the autonomous vehicle. Based on the virtually determined movements, the simulations system 124 may determine updated positions of the autonomous vehicle and/or of the surrounding objects. In some embodiments, the simulations system 124 may provide the virtually determined movements and/or the updated positions to the sensor drivers and world engine 102 so that the total measurable world as represented by the sensor drivers and world engine 102 may be updated based on the simulation results.

In some embodiments, the autonomous driving system 100 may include a fleet management system 126 that obtains information from multiple autonomous vehicles communicatively coupled to the fleet management system 126. The fleet management system 126 may relay information between different autonomous vehicles in communication with the fleet management system 126 to coordinate operations of the multiple autonomous vehicles. In these and other embodiments, a user managing fleet operations may use a mobile app 128 to receive information from and/or send information or commands to a fleet of autonomous vehicles.

Modifications, additions, or omissions may be made to the autonomous driving system 100 without departing from the scope of the present disclosure. For example, the designations of different elements in the manner described is meant to help explain concepts described herein and is not limiting. For instance, in some embodiments, the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and the mobile app 128 are delineated in the specific manner described to help with explaining concepts described herein but such delineation is not meant to be limiting. Further, the autonomous driving system 100 may include any number of other elements or may be implemented within other systems or contexts than those described.

Figure 2A:
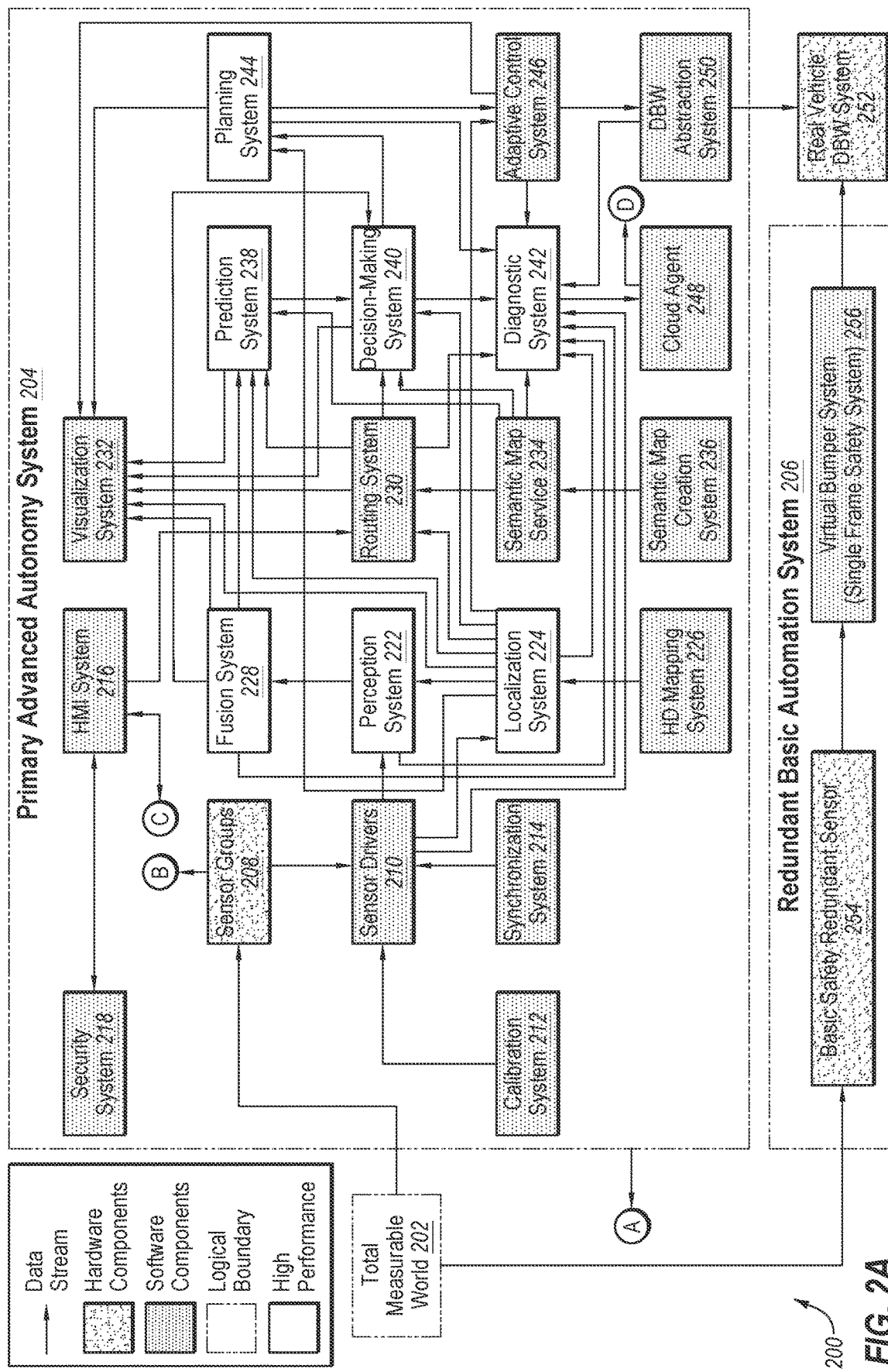
FIGS. 2A-2C illustrate an example AV computing system for autonomous driving according to at least one embodiment the present disclosure.
Figure 2B:
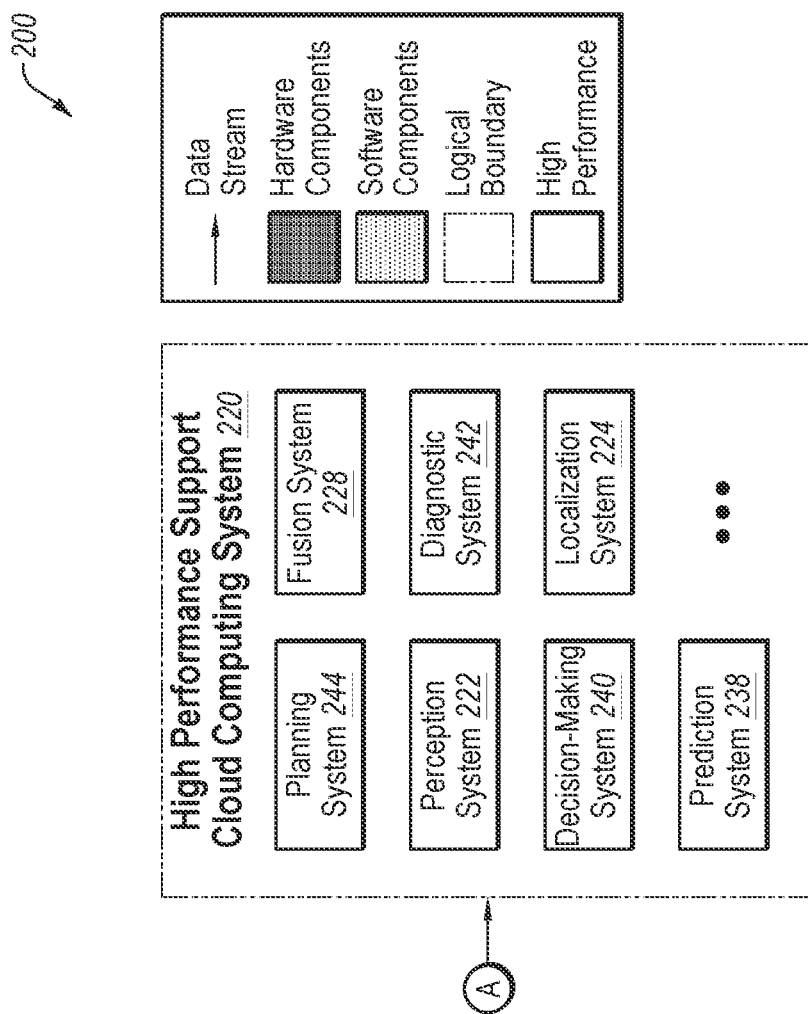
Figure 2C:
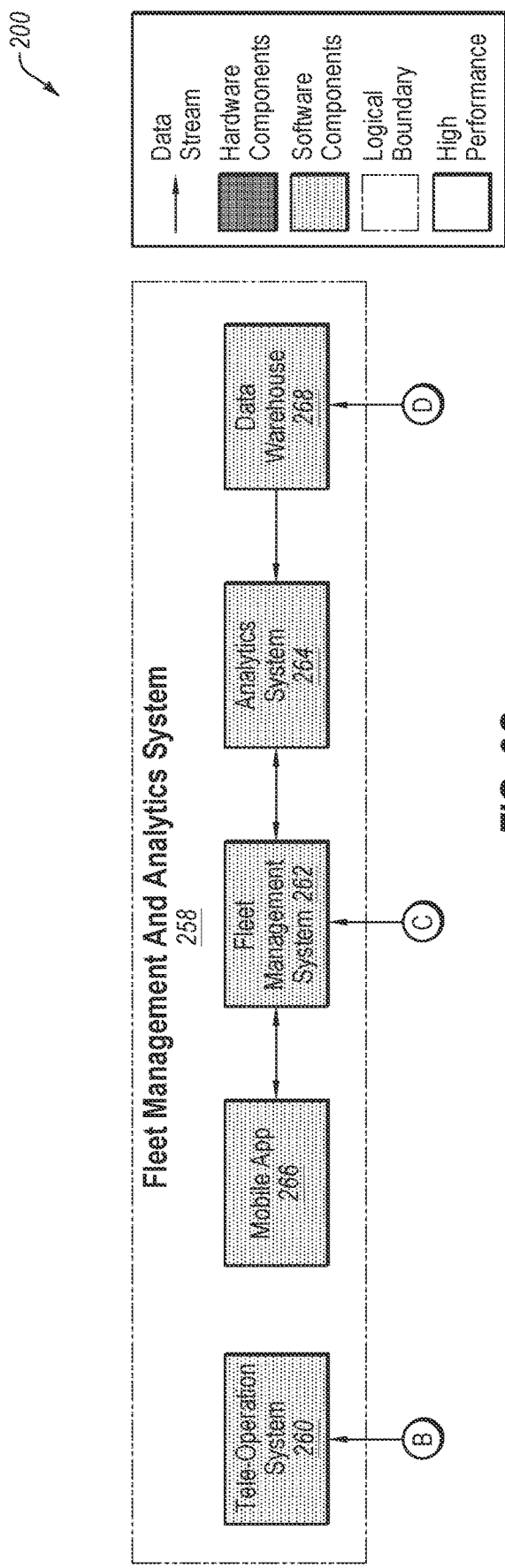

FIGS. 2A-2C illustrate an example AV computing system 200 for autonomous driving according to at least one embodiment of the present disclosure. In some embodiments, the AV computing system 200 may include one or more computing subsystems in which each of the computing subsystems includes one or more computing modules configured to perform operations and/or computations associated with control of the AV.

In these and other embodiments, the computing subsystems may be included as part of the on-board computing system and/or as part of a high-performance support cloud computing system 220 communicatively coupled to the on-board computing system and/or any other aspects of the AV. For example, a primary advanced autonomy system 204 may be configured to perform various computations relating to driving operations of the AV and a redundant basic automation system 206 that may be configured to perform basic automated driving operations for the AV if the primary advanced autonomy system 204 is malfunctioning in some way. For example, the redundant basic automation system 206 may be implemented to take over future driving operations of the AV in situations in which a connection between the primary advanced autonomy system 204 and the high-performance support cloud computing system 220 is unavailable.

In some embodiments, the redundant basic automation system 206 may include one or more basic safety redundant sensors 254 and/or a virtual bumper system 256 to facilitate basic automation of a given AV in situations in which the primary advanced autonomy system 204 is unresponsive, inaccurate, or otherwise fails to operate. In some embodiments, the redundant basic automation system 206 may be configured to control movement of the given AV and/or perform other operations associated with the given AV. The redundant basic automation system 206 may be included in the on-board computing system of the given AV, and the basic redundant sensors 254 may be configured to collect information about the total measurable world 202 in response to the given AV determining that the sensor groups 208 of the primary advanced autonomy system 204 are inoperable in some capacity. Additionally or alternatively, the basic redundant sensors 254 may always be in operation although the data sensed thereby may be discarded or stored without being used for computations or in determinations of how the AV should be operated in normal operation. In some embodiments, the virtual bumper system 256 may provide a virtual fence around the given AV that may be used to determine what basic operations the given AV should perform. For example, the given AV may be instructed to slow down and eventually stop moving altogether in response to any object entering the range of the virtual bumper system 256. The virtual bumper system 256 and/or any other basic safety redundant sensors may allow the given AV to continue to operate in situations in which communications with the off-board cloud computing system are hindered, the primary advanced autonomy system 204 is inoperable, and/or under any other adverse circumstances. Accordingly, the AV computing system 200 may or may not be configured to perform operations associated with the basic safety redundant sensors 254 and/or the virtual bumper system 256 using the on-board computing system without off-loading computation processing to the high-performance support cloud computing system 220.

In some embodiments, the primary advanced autonomy system 204 may be communicatively coupled with the high-performance support cloud computing system 220, which may include a perception system 222 configured to detect objects in an environment around the AV, a localization system 224 configured to determine a location of the AV, a fusion system 228 configured to fuse elements obtained from the perception system 222, a prediction system 238 configured to determine projected trajectories for the objects, a decision-making system 240 configured to determine one or more driving decisions, a diagnostic system 242 configured to review information provided by other computing subsystems and identify computing errors, a planning system 244 configured to plan and schedule driving operations for the AV, any other computing subsystems, or some combination thereof.

In some embodiments, selecting the computing subsystems to be included in the high-performance support cloud computing system 220 may be based on a computing-resource usage of the computing subsystems when implemented on the on-board computing system, a data-processing speed of the computing modules, and/or any other computing metrics. For example, the high-performance support cloud computing system 220 may include computing subsystems absent from the on-board computing system as described above and as illustrated in FIGS. 2A-2C. Additionally or alternatively, the high-performance support cloud computing system 220 may include all or most of the computing subsystems described in relation to the primary advanced autonomy system 204, while the primary advanced autonomy system 204 only includes computing subsystems that are needed for driving of the AV, such as one or more sensor groups 208 and/or a real vehicle drive-by-wire system 252, or simplified computing subsystems that may perform basic operations and/or computations in situations in which the high-performance support cloud computing system 220 is unavailable or malfunctioning.

In some embodiments, the on-board computing system may be a light or lean computing system. For example, the on-board computing system may be limited to including a network communication device (such as a 5G cellular communication chip), a suite of sensors for obtaining information regarding the surroundings of the AV and/or the operation of the AV, a bus for communication between the components, and/or a small computing device with limited storage and instructions. For example, the stored instructions may include instructions to convey sensor data and/or other information to the off-board computing device. As another example, the stored instructions may include instructions to perform diagnostic actions or to take remedial actions. Such remedial actions may be limited to slowing and stopping the AV in a safe manner to avoid an accident if the connection to the off-board computing system is lost. In some embodiments, the remedial actions may utilize the virtual bumper system 256. By using such a light computing system, the computing device may utilize limited power and have a small footprint within the physical constraints of the AV.

The computing subsystems of the on-board computing system of the primary advanced autonomy system 204 may include, for example, the one or more sensor groups 208, one or more sensor drivers 210, a calibration system 212, a synchronization system 214, a human-machine interface (HMI) system 216, a security system 218, a high-definition mapping system 226, a routing system 230, a visualization system 232, a semantic map service 234, a semantic map creation system 236, an adaptive control system 246, a cloud agent 248, a drive-by-wire (DBW) abstraction system 250, the real vehicle DBW system 252, any other computing subsystems that may be configured to facilitate operation of the given AV, or some combination thereof. Additionally or alternatively, the AV computing system 200 may include the sensor drivers and world engine 102, the mapping system 104, the localization system 106, the routing system 108, the prediction system 110, the decision system 112, the planning system 114, the control system 116, the drive-by-wire system 118, the visualization system 120, the diagnostics system 122, the simulations system 124, the fleet management system 126, and/or the mobile app 128 as described in relation to the autonomous driving system 100 of FIG. 1.

In some embodiments, the sensor groups 208 may include one or more sensors that are configured to collect the information about a total measurable world 202, and sensor drivers 210, a calibration system 212, and/or a synchronization system 214 may be configured to process sensor data collected by the sensor groups 208 and send the information to one or more computing subsystems of the given AV. The sensor drivers 210 may facilitate connecting between the sensor groups 208, the calibration system 212, and the synchronization system 214 such that information collected by the sensor groups 208 may be obtained by other computing subsystems of the primary advanced autonomy system 204. The calibration system 212 may be configured to calibrate one or more of the sensors included in the sensor groups 208 to ensure sensor data collected by the sensor groups 208 accurately reflects details of the total measurable world 202. Because the sensor data collected by different sensors included in the sensor groups 208 may be collected at different capture rates, the synchronization system 214 may align the collected sensor data such that the sensor data may be readily interpreted and analyzed by other computing subsystems. The HMI system 216 may include a user interface that allows a human user to input information that may influence driving operations of the AV. The security system 218 may prevent user input via the HMI system 216 from affecting computations and/or driving operations of the AV. The high-definition mapping system 226 may populate a map that provides additional context about the given environment in which the AV operates and may maintain a map such that if the AV traverses an area where it has previously traveled the AV can rely at least in part on the previously generated map. The routing system 230 may determine a route for the AV to reach an intended destination of the AV through the environment and/or the total measurable world 202. The visualization system 232 may display computational results and/or information relating to the driving operations of the AV in a way that users may understand. The semantic map service 234 and the semantic map creation system 236 may generate a semantic map that provides semantic meaning for one or more objects or elements of the total measurable world 202 in which the semantic meaning provides a traffic and/or driving context for the objects or elements of the total measurable world 202 (e.g., the application of traffic rules to a bike lane or a four-way stop, rather than merely categorization of objects as a roadway or a stop sign). Driving decisions, such as decisions made by the decision-making system 240 included with the high-performance support cloud computing system 220, may be sent to the adaptive control system 246 in a sequence that facilitates safe and efficient driving operations for the AV to reach the intended destination. The DBW abstraction system 250 may receive control information from the adaptive control system 246 and provide instructions to the real vehicle DBW system 252, which may actuate and affect driving operations of the AV, such as accelerating, braking, steering, or any other actions performable by the AV.

In some embodiments, the AV computing system 200 may include the cloud agent 248, which may facilitate communication between the on-board computing system and one or more off-board cloud computing systems, such as the high-performance support cloud computing system 220 and/or a fleet management system that is configured to facilitate autonomous operations of a group of autonomous vehicles under the supervision of one or more users. For example, the AV computing system 200 may include a fleet management and analytics system 258 that includes a fleet management system 262 configured to receive information relating to one or more AVs and/or send information and driving instructions to the one or more AVs. The fleet management and analytics system 258 may additionally or alternatively include an analytics system 264 configured to perform computations relating to a given AV included in the fleet with respect to one or more other AVs included in the fleet that may or may not be within the vicinity of the given AV. For example, the analytics system 264 may be configured to perform computations that may improve traffic flow for a given AV that is an ambulance by rerouting other AVs included in the fleet. In some embodiments, the fleet management and analytics system 258 may include a mobile app 266 that allows a user to review the operations of one or more AVs included in the fleet and a data warehouse 268 that compiles information relating to the AVs included in the fleet that may or may not be retrieved for computations by the fleet management system 262 and/or the analytics system 264. Additionally or alternatively, the fleet management and analytics system 258 may include a tele-operation system 260 that facilitates remote control of one or more of the AVs associated with the fleet management and analytics system 258 by a human user.

In some embodiments, the on-board computing system associated with the primary advanced autonomy system 204 may include device drivers and/or any other software drivers that facilitate communication between the computing subsystems of the high-performance support cloud computing system 220 and the computing subsystems of the on-board computing system of the primary advanced autonomy system 204. For example, a given software driver may facilitate communicating information provided by the sensor drivers 210 to the perception system 222 of the high-performance support cloud computing system 220. As an additional or alternative example, a second given software driver may facilitate communicating information provided by the HD mapping system 226 to the localization system 224 of the high-performance support cloud computing system 220. As an additional or alternative example, a third given software driver may facilitate communicating information provided by the planning system 244 of the high-performance support cloud computing system 220 to the visualization system 232 included with the on-board computing system of the primary advanced autonomy system 204.

Allocating some computational processes to the high-performance support cloud computing system 220 may facilitate more accurate and/or comprehensive computations than performing the computational processes using the on-board computing system. In some embodiments, the high-performance support cloud computing system 220 may perform more resource-intensive computations than the on-board computing system because the high-performance support cloud computing system 220 may include a greater quantity of graphical processing units (GPUs) and/or more robust GPUs. Additionally or alternatively, performing computations at the high-performance support cloud computing system 220 may facilitate operations relating to multiple AVs (e.g., for a fleet-management computing system) and/or more efficient machine learning based on the computations performed at the high-performance support cloud computing system 220 such that machine learning tasks relating to object detection, localization, or any other driving processes may be more readily performed by the high-performance support cloud computing system 220.

For example, the high-performance support cloud computing system 220 may perform object-detection computations more effectively than such object-detection computations if performed by the on-board computing system because the additional computational resources available to the high-performance support cloud computing system 220 may allow the high-performance support cloud computing system 220 to detect a greater number of objects and/or more accurately identify objects that are detected. As another example, the localization system 224 of the high-performance support cloud computing system 220 may more accurately localize a corresponding AV and/or localize the corresponding AV with greater detail than the same or a similar localization system implemented by the on-board computing system. As an additional or alternative example, the prediction system 238 system of the high-performance support cloud computing system 220 may predict the trajectories of one or more objects more accurately, with higher granularity, and/or for a longer period of time than the same or a similar prediction system of a corresponding on-board computing system. As an additional or alternative example, the decision-making system 240 may make more accurate and/or faster decisions when the decision-making system 240 is implemented with the high-performance support cloud computing system 220 when compared with the same or a similar decision-making system 240 implemented with the on-board computing system.

In some embodiments, computations allocated between the on-board computing system and the high-performance support cloud computing system 220 may facilitate increasing and/or decreasing the rate (e.g., frames per second or FPS) of computation performance to more efficiently utilize computational resources. As such, while it may be beneficial to increase the computational performance of some processes (e.g., computations processed by the high-performance support cloud computing system 220), it may also be beneficial to decrease the computational performance of other processes in situations where increased computational performance would be unlikely to provide improvements to the AV computing system. As such, the AV computation system 200 may include computing subsystems designated for processing by the on-board computing system at a decreased computation processing rate, while other computing subsystems as described above may be designated for processing by the high-performance support cloud computing system 220, which may process computations at a much higher rate than the on-board computing system because the high-performance support cloud computing system 220 includes a greater number of and/or more computationally robust processors and/or computational resources. Consequently, the AV computing system 200 may provide a computer architecture that improves the overall distribution and/or efficiency of computations for autonomous driving.

In these and other embodiments, the AV computing system 200 may be configured to decrease the computational performance of a given computing task according to an operational design domain of the given computing task. For example, on a low-speed road that is not very busy, the high-performance support cloud computing system 220 may perform prediction and decision-making at a slower processing FPS, while on a busier road at higher speeds, the prediction and/or decision-making may be performed at a faster processing FPS. As another example, when operating on an open floor of a warehouse without other vehicles around, the high-performance support cloud computing system 220 may perform the object detection and characterization at a slower processing FPS while in a busy parking lot, the object detection and characterization may be performed at a faster processing FPS.

Additionally or alternatively, the adaptive computation system may include multiple settings of computational performance, which may be configurable by a human user and/or a machine-learning system. As such, a user expecting heavy computational loads (e.g., high object density in an environment, accurate computations needed, fast computations needed, etc.) may select a high-performance setting, while a user expecting light computational loads (e.g., sparse object density) may select a low-performance setting to reduce operating costs relative to performing computations at a higher performance setting.

Modifications, additions, or omissions may be made to the AV computing system 200 without departing from the scope of the present disclosure. For example, the designations of different elements in the manner described is meant to help explain concepts described herein and is not limiting. For instance, in some embodiments, the primary advanced autonomy system 204, the redundant basic automation system 206, the high-performance support cloud computing system 220, and/or any computing subsystems corresponding to the primary advanced autonomy system 204, the redundant basic automation system 206, and/or the high-performance support cloud computing system 220 are delineated in the specific manner described to help with explaining concepts described herein but such delineation is not meant to be limiting. Further, the AV computing system 200 may include any number of other elements or may be implemented within other systems or contexts than those described.

Figure 3:
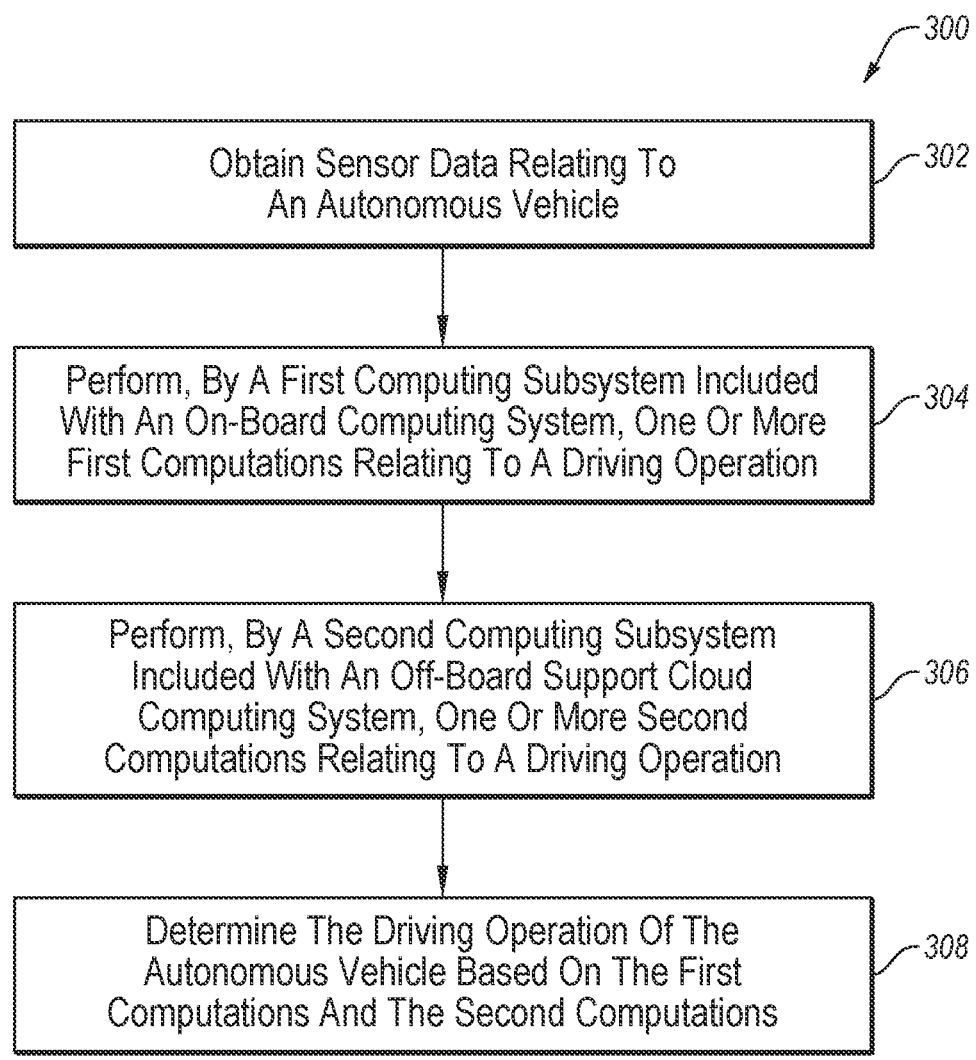
FIG. 3 is a flowchart of an example method of performing computations between an on-board computing system and an off-board support cloud computing system according to a computing system architecture as described in relation to at least one embodiment of the present disclosure.

FIG. 3 is a flowchart of an example method 300 of performing computations between an on-board computing system and an off-board support cloud computing system, such as the high-performance support cloud computing system 220 as described in relation to FIGS. 2A-2C, according to a computing system architecture as described in relation to one or more embodiments of the present disclosure. The method 300 may be performed by any suitable system, apparatus, or device. For example, the primary advanced autonomy system 204, the redundant basic automation system 206, the high-performance support cloud computing system 220, and/or any computing subsystems corresponding to the primary advanced autonomy system 204, the redundant basic automation system 206, and/or the high-performance support cloud computing system 220 of FIGS. 2A-2C may perform one or more operations associated with the method 300. Although illustrated with discrete blocks, the steps and operations associated with one or more of the blocks of the method 300 may be divided into additional blocks, combined into fewer blocks, or eliminated, depending on the particular implementation.

The method 300 may begin at block 302, where sensor data relating to an AV and/or a total measurable world around the AV may be obtained. In some embodiments, the sensor data may be the same as or similar to the sensor data obtained by the sensor groups 208 of the AV computing system 200 of FIGS. 2A-2C. The obtained sensor data may relate to the total measurable world 202. Additionally or alternatively, the sensor data may relate to a state of the AV, the driving operations of the AV, and/or any other aspects relating to the AV.

At block 304, a first computing subsystem included with an on-board computing system may perform one or more first computations relating to a driving operation of the AV based on the obtained sensor data. In some embodiments, the first computing subsystem may include one or more sensor groups, a communication bus, a computing device with storage and instructions limited to performing remedial actions and the first operations, and a real vehicle drive-by-wire system, and the first computations may relate to collecting sensor data, sending sensor data to an off-board computing system, receiving computational results from the off-board computing system, and implementing the driving operation of the AV.

At block 306, a second computing subsystem included with an off-board support cloud computing system may perform one or more second computations relating to a driving operation of the AV based on the obtained sensor data. In some embodiments, the second computing subsystem may include a perception system, a localization system, a fusion system, a prediction system, a decision-making system, a diagnostic system, a planning system, any other computing systems associated with operations of an AV, or some combination thereof. Additionally or alternatively, the second computations performed by the second computing subsystems may be based on computational results corresponding to the first computations performed by the first computing subsystems as described in relation to block 304. In some embodiments, the off-board support cloud computing system may include a greater number of computational resources and/or more robust computing processors than the on-board computing system to facilitate performing computations relating to perception of the total measurable world, localization of the AV, fusion of the sensor data, prediction of trajectories of objects around the AV, rendering a decision of a next driving operation, or some combination thereof.

In some embodiments, the computing subsystems included with the off-board support cloud computing system or the on-board computing system may be organized such that the computing subsystems that typically process computations using more computational resources are designated to the off-board support cloud computing system. In other words, computing subsystems associated with more computationally intensive processes may be performed by the off-board support cloud computing system so that such computing subsystems have access to a greater amount of and/or more robust computing resources. By designating which of the off-board support cloud computing system or the on-board computing system performs given computations before initiating computational operation of the AV, the computations relating to driving operation of the AV may be performed more efficiently than if such computations are adaptively allocated between the off-board support cloud computing system and the on-board computing system. For example, encoding and decoding data packages and/or context switching between processing tasks may be simplified because whether a given processing task will be performed by the off-board support cloud computing system or the on-board computing system may be known with confidence prior to computation of the given processing task.

At block 308, the driving operation of the AV may be determined based on the first computations and the second computations. The driving operation may include an action performable by the given AV, which may or may not be actuated by the real vehicle DBW system 252 of the AV computing system 200 of FIGS. 2A-2C. For example, the driving operation may include the given AV braking, steering, accelerating, turning on a turn-signal indicator, or any other actions performable by a vehicle while driving Modifications, additions, or omissions may be made to the method 300 without departing from the scope of the disclosure. For example, the designations of different elements in the manner described is meant to help explain concepts described herein and is not limiting. Further, the method 300 may include any number of other elements or may be implemented within other systems or contexts than those described.

Figure 4:
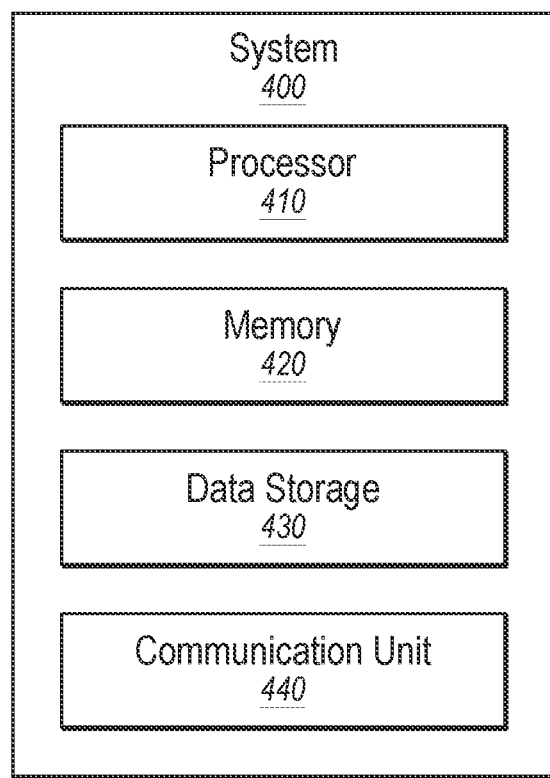
FIG. 4 is an example computing system.

FIG. 4 illustrates an example computing system 400, according to at least one embodiment described in the present disclosure. The computing system 400 may include a processor 410, a memory 420, a data storage 430, and/or a communication unit 440, which all may be communicatively coupled. Any or all of the AV computing system 200 of FIGS. 2A-2C may be implemented as a computing system consistent with the computing system 400, including the primary advanced autonomy system 204, the redundant basic automation system 206, the high-performance support cloud computing system 220, and/or any computing subsystems corresponding to the primary advanced autonomy system 204, the redundant basic automation system 206, and/or the high-performance support cloud computing system 220.

Generally, the processor 410 may include any suitable special-purpose or general-purpose computer, computing entity, or processing device including various computer hardware or software modules and may be configured to execute instructions stored on any applicable computer-readable storage media. For example, the processor 410 may include a microprocessor, a microcontroller, a digital signal processor (DSP), an application-specific integrated circuit (ASIC), a Field-Programmable Gate Array (FPGA), or any other digital or analog circuitry configured to interpret and/or to execute program instructions and/or to process data.

Although illustrated as a single processor in FIG. 4, it is understood that the processor 410 may include any number of processors distributed across any number of network or physical locations that are configured to perform individually or collectively any number of operations described in the present disclosure. In some embodiments, the processor 410 may interpret and/or execute program instructions and/or process data stored in the memory 420, the data storage 430, or the memory 420 and the data storage 430. In some embodiments, the processor 410 may fetch program instructions from the data storage 430 and load the program instructions into the memory 420.

After the program instructions are loaded into the memory 420, the processor 410 may execute the program instructions, such as instructions to perform operations associated with a given on-board computing system and/or a given off-board support cloud computing system associated with a given AV computing system.

The memory 420 and the data storage 430 may include computer-readable storage media or one or more computer-readable storage mediums for having computer-executable instructions or data structures stored thereon. Such computer-readable storage media may be any available media that may be accessed by a general-purpose or special-purpose computer, such as the processor 410. For example, the memory 420 and/or the data storage 430 may store the sensor data and/or the computational results of the on-board computing system and/or the off-board cloud computing system. In some embodiments, the computing system 400 may or may not include either of the memory 420 and the data storage 430.

By way of example, and not limitation, such computer-readable storage media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other storage medium which may be used to store desired program code in the form of computer-executable instructions or data structures and which may be accessed by a general-purpose or special-purpose computer. Combinations of the above may also be included within the scope of computer-readable storage media. Computer-executable instructions may include, for example, instructions and data configured to cause the processor 410 to perform a certain operation or group of operations.

The communication unit 440 may include any component, device, system, or combination thereof that is configured to transmit or receive information over a network. In some embodiments, the communication unit 440 may communicate with other devices at other locations, the same location, or even other components within the same system. For example, the communication unit 440 may include a modem, a network card (wireless or wired), an optical communication device, an infrared communication device, a wireless communication device (such as an antenna), and/or chipset (such as a Bluetooth device, an 802.6 device (e.g., Metropolitan Area Network (MAN)), a WiFi device, a WiMax device, cellular communication facilities, or others), and/or the like. The communication unit 440 may permit data to be exchanged with a network and/or any other devices or systems described in the present disclosure. For example, the communication unit 440 may allow the system 400 to communicate with other systems, such as computing devices and/or other networks.

One skilled in the art, after reviewing this disclosure, may recognize that modifications, additions, or omissions may be made to the system 400 without departing from the scope of the present disclosure. For example, the system 400 may include more or fewer components than those explicitly illustrated and described.

The embodiments described in the present disclosure may include the use of a special purpose or general-purpose computer including various computer hardware or software modules. Further, embodiments described in the present disclosure may be implemented using computer-readable media for having computer-executable instructions or data structures stored thereon.

Terms used in the present disclosure and especially in the appended claims (e.g., bodies of the appended claims) are generally intended as "open terms" (e.g., the term "including" should be interpreted as "including, but not limited to.").

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is expressly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase preceding two or more alternative terms, whether in the description, claims, or drawings, should be understood to contemplate the possibilities of including one of the terms, either of the terms, or both of the terms. For example, the phrase "A or B" should be understood to include the possibilities of "A" or "B" or "A and B."

All examples and conditional language recited in the present disclosure are intended for pedagogical objects to aid the reader in understanding the present disclosure and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. An autonomous driving computing system, comprising:
an on-board computing system configured to store first instructions that, in response to being executed, cause the on-board computing system to perform first operations comprising:
obtaining sensor data representative of an autonomous vehicle (AV) and a total measurable world around the AV;
receiving input from a user, the input indicating an expected computational load;
designating a first computation and a second computation to be computed by an off-board cloud computing system and encoded before initiating performance of the first computation and the second computation by the off-board cloud computing system;
designating a third computation to be computed by the on-board computing system;
selecting a rate of computation performance for the first computation and the second computation based on the expected computational load;
sending the sensor data to the off-board cloud computing system;
performing the third computation;
receiving, from the off-board cloud computing system, a control signal corresponding to a driving operation of the AV; and
performing the driving operation by implementing the control signal and based on the performance of the third computation; and
the off-board cloud computing system configured to store second instructions that, in response to being executed, cause the off-board cloud computing system to perform second operations comprising:
receiving, from the on-board computing system, the sensor data;
determining a priority of performance of the first computation and the second computation based on computational resources to be used to perform the first computation and computational resources to be used to perform the second computation;
performing, based on the determined priority of performance, the first computation and the second computation at the selected rate of computation of performance, wherein at least one of the first computation or the second computation is performed at least partially in parallel with the on-board computing system performing the third computation;

determining the control signal corresponding to the driving operation of the AV based on the performance of the first computation and the second computation; and sending the control signal to the on-board computing system.

2. The autonomous driving computing system of claim 1, further comprising a redundant basic automation system that is configured to take over future driving operation of the AV responsive to determining that a connection to the off-board cloud computing system is unavailable.

3. The autonomous driving computing system of claim 2, wherein the redundant basic automation system is limited to performing remedial actions to slow and stop the AV.

4. The autonomous driving computing system of claim 1, wherein the off-board cloud computing system includes at least one of: a perception system, a localization system, a fusion system, a prediction system, a decision-making system, a diagnostic system, or a planning system.

5. The autonomous driving computing system of claim 1, wherein the on-board computing system includes one or more sensor groups, a communication bus, a computing device with storage and instructions limited to performing remedial actions and the first operations, and a real vehicle drive-by-wire system.

6. The autonomous driving computing system of claim 1, wherein the off-board cloud computing system includes a greater number of computational resources than the on-board computing system.

7. The autonomous driving computing system of claim 1, wherein performing the first computation and the second computation includes at least one of performing operations related to perception of the total measurable world, localization of the AV, fusion of the sensor data, prediction of trajectories of objects around the AV, or rendering a decision of a next driving operation.

8. A method, comprising:

obtaining, by an on-board computing system associated with an autonomous vehicle (AV), sensor data representative of the AV and a total measurable world around the AV;

receiving input from a user, the input indicating an expected computational load;

designating a first computation and a second computation to be computed by an off-board cloud computing system and encoded before initiating performance of the first computation and the second computation by the off-board cloud computing system;

designating a third computation to be computed by the on-board computing system;

selecting a rate of computation performance for the first computation and the second computation based on the expected computational load;

sending the sensor data to the off-board cloud computing system;

performing, by the on-board computing system, the third computation;

receiving, by the off-board cloud computing system, the sensor data;

determining a priority of performance of the first computation and the second computation based on computational resources to be used to perform the first computation and computational resources to be used to perform the second computation;

performing, by the off-board cloud computing system and based on the determined priority of performance, the first computation and the second computation at the selected rate of computation of performance, wherein at least one of the first computation or the second computation is performed at least partially in parallel with the third computation;

determining, by the off-board cloud computing system, a control signal corresponding to a driving operation of the AV based on the performance of the first computation and the second computation;

sending the control signal to the on-board computing system;

receiving, by the on-board computing system, the control signal corresponding to the driving operation of the AV; and performing the driving operation by implementing the control signal and based on the performance of the third computation.

9. The method of claim 8, further comprising:

determining if a connection to the on-board computing system or the off-board cloud computing system is unavailable; and responsive to determining that the connection to the on-board computing system or the off-board cloud computing system is unavailable, controlling, by a redundant basic automation system a future driving operation of the AV.

10. The method of claim 9, wherein the redundant basic automation system is limited to performing remedial actions to slow and stop the AV.

11. The method of claim 8, wherein the off-board cloud computing system includes at least one of: a perception system, a localization system, a fusion system, a prediction system, a decision-making system, a diagnostic system, or a planning system.

12. The method of claim 8, wherein the on-board computing system includes one or more sensor groups, a communication bus, a computing device with storage and instructions limited to performing remedial actions and communication with the off-board cloud computing system, and a real vehicle drive-by-wire system.

13. The method of claim 8, wherein the off-board cloud computing system includes a greater number of computational resources than the on-board computing system.

14. The method of claim 8, wherein performing the first computation and the second computation includes performing operations related to at least one of perception of the total measurable world, localization of the AV, fusion of the sensor data, prediction of trajectories of objects around the AV, or rendering a decision of a next driving operation.

15. One or more non-transitory computer-readable storage media configured to store instructions that, in response to being executed, cause a system to perform operations, the operations comprising:

obtaining, by an on-board computing system associated with an autonomous vehicle (AV), sensor data representative of the AV and a total measurable world around the AV;

receiving input from a user, the input indicating an expected computational load;

selecting a rate of computation performance for a first computation and a second computation based on the expected computational load;

sending the sensor data to an off-board cloud computing system including a particular computing subsystem that schedules one or more computations performable by the off-board cloud computing system to decrease an amount of time spent on encoding processes of the computations relating to operations of the AV;

receiving, by the off-board cloud computing system, the sensor data;

performing, by one or more computing subsystems of the off-board cloud computing system, the first computation and the second computation at the selected rate of computation of performance, wherein:

performance of the first computation and performance of the second computation are prioritized with respect to each other by the particular computing subsystem according to a first computational resource usage of the first computation and a second computational resource usage of the second computation to facilitate more efficient and faster processing of the first computation and the second computation relative to performing the first computation and the second computation without prioritizing the first computation and the second computation according to the first computational resource usage and the second computational resource usage; and the first computation and the second computation are designated to be computed by the off-board cloud computing system and encoded before initiating computational operation of the first computation and the second computation by the off-board cloud computing system;

determining, by the off-board cloud computing system, a control signal corresponding to a driving operation of the AV based on the performance of the first computation and the second computation;

sending the control signal to the on-board computing system;

receiving, by the on-board computing system, the control signal corresponding to the driving operation of the AV; and performing the driving operation by implementing the control signal.

16. The one or more non-transitory computer-readable storage media of claim 15, wherein the operations further comprise:

determining whether a connection to the on-board computing system or the off-board cloud computing system is unavailable; and responsive to determining that the connection to the on-board computing system or the off-board cloud computing system is unavailable, controlling, by a redundant basic automation system a future driving operation of the AV.

17. The one or more non-transitory computer-readable storage media of claim 16, wherein the redundant basic automation system is limited to performing remedial actions to slow and stop the AV.

18. The one or more non-transitory computer-readable storage media of claim 15, wherein the computing subsystems of the off-board cloud computing system include at least one of: a perception system, a localization system, a fusion system, a prediction system, a decision-making system, a diagnostic system, or a planning system.

19. The one or more non-transitory computer-readable storage media of claim 15, wherein the on-board computing system includes one or more sensor groups, a communication bus, a computing device with storage and instructions limited to performing remedial actions and communication with the off-board cloud computing system, and a real vehicle drive-by-wire system.

20. The one or more non-transitory computer-readable storage media of claim 15, wherein performing the first computation and the second computation includes performing operations related to at least one of perception of the total measurable world, localization of the AV, fusion of the sensor data, prediction of trajectories of objects around the AV, or rendering a decision of a next driving operation.

* * * * *